(12) United States Patent
Brown

(10) Patent No.: US 9,244,333 B1
(45) Date of Patent: Jan. 26, 2016

(54) OPTICAL BISTABLE-SWITCHING IN LOCALIZED PLASMON-POLARITONS CHAIN NANOPARTICLES—FOR LOGIC, MEMORY AND NANO-COMPUTING APPLICATIONS

(75) Inventor: Robert G. Brown, Tustin, CA (US)

(73) Assignee: Rockwell Collins, Inc.

( * ) Notice: Subject to any disclaimer, the term of this patent is extended or adjusted under 35 U.S.C. 154(b) by 644 days.

(21) Appl. No.: 13/607,294

(22) Filed: Sep. 7, 2012

(51) Int. Cl.
*G02F 3/02* (2006.01)

(52) U.S. Cl.
CPC .................................. *G02F 3/02* (2013.01)

(58) Field of Classification Search
CPC ......... G02F 3/00; B82Y 10/00; G01N 99/002
See application file for complete search history.

(56) References Cited

U.S. PATENT DOCUMENTS

| 8,633,729 B1 | 1/2014 | Brown | |
|---|---|---|---|
| 2010/0175745 A1* | 7/2010 | Kostecki et al. | 136/255 |

OTHER PUBLICATIONS

Bohn, J. L., et al., 'Field enhancement in apertureless near-field scanning optical microscopy', Journal of the Optical Society of America, (2001), pp. 2998-3006, vol. 18, No. 12, 9 pages.

Boyd, R. W., 'Nonlinear Optics', (2003) Academic Press, 2nd Edition, 10 pages.
Duan, H., et al., 'Nanoplasmonics: Classical down to the nanometer scale', (2012) Nano Letters, 7 pages.
Maier, S. A., 'Gain-assisted propagation of electromagnetic energy in sub-wavelength surface plasmon polariton gap waveguides', (2006) Optics Communications, 258, pp. 295-299, 5 pages.
Maier, S. A., 'Plasmonics: Fundamentals and Applications', (2007) Springer Science+Business Media LLC., New York, NY. 8 pages.
Mano, M. M., 'Digital Logic and Computer Design', (1979) Prentice Hall Inc., Englewood Cliffs, NJ, 7 pages.
Marinica, D. C., et al., 'Quantum Plasmonics: nonlinear effects in the field enhancement of a plasmonic nanoparticle dimer' (2011) Nano Letters, 7 pages.
Palik, E. D., 'Handbook of Optical Constants of Solids', Elsevier, (1998), 9 pages.
Saleh, B. E. A., et al. 'Fundamentals of Photonics', (2007) Wiley-Interscience, 2nd Edition, pp. 1058-1067.

* cited by examiner

*Primary Examiner* — Jennifer L. Doak
(74) *Attorney, Agent, or Firm* — Angel Gerdzhikov; Donna Suchy; Daniel Barbieri

(57) ABSTRACT

An optically bistable element is described. The optically bistable element has an arrangement of nano-particles configured to propagate localized plasmon-polaritons (LLPs). The optically bistable element may act as switch. A computing structure is also described, where the computing structure comprises one or more of the optically bistable elements acting as switches.

19 Claims, 5 Drawing Sheets

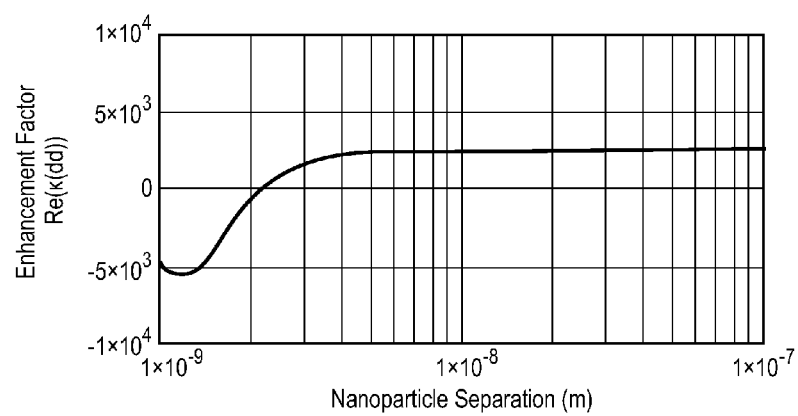
FIG. 3
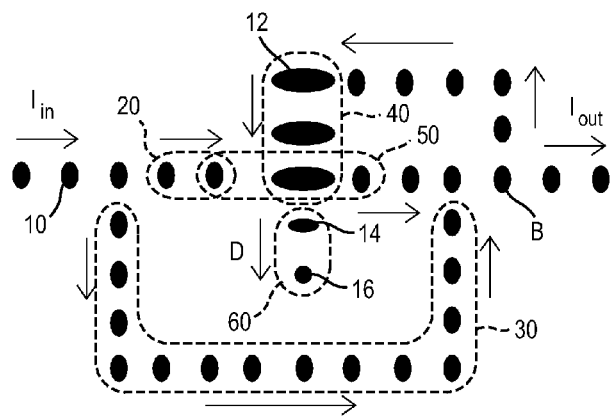
FIG. 4
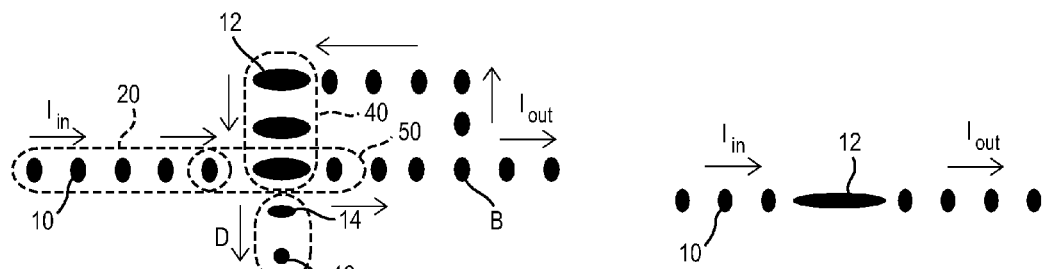
FIG. 5
FIG. 6

OPTICAL BISTABLE-SWITCHING IN LOCALIZED PLASMON-POLARITONS CHAIN NANOPARTICLES—FOR LOGIC, MEMORY AND NANO-COMPUTING APPLICATIONS

FIELD OF THE INVENTION

The present disclosure relates to an optical bistable switch using localized plasmon-polaritons (LPPs), and the use of the optical bistable switch in computing structures.

BACKGROUND OF THE INVENTION

In optical bistability two resonant transmission states are possible and stable, depending on the optical input. Optical bistability in certain materials has been demonstrated. For example, optical bistability in Na vapor, or in semiconductor materials, such as InSb, has been demonstrated.

While optical bistability has been demonstrated in certain material systems, such bistability has not been shown in nano-particle systems based on LPPs.

SUMMARY OF THE INVENTION

According to one embodiment of the invention there is provided an optically bistable element. The optically bistable element comprises an arrangement of nano-particles configured to propagate localized plasmon-polaritons (LLPs).

According to an aspect of the embodiment, the nano-particles are embedded within a matrix material, the nano-particles comprise at least one of a metal, a semiconductor, a doped oxide, a doped nitride, a carbon nanotube, or graphene.

According to an aspect of the embodiment, the metal comprises gold or silver.

According to an aspect of the embodiment, the nano-particle sizes are in the region between a characteristic dimension of 0.1 nm to 500 nm.

According to an aspect of the embodiment, the nano-particles comprise nano-particles with shapes including spheres, spheroids, ellipsoids, cylinders, cubes, stars, rectangular-cubic, spiral-twisted, v-shapes, or left or right square C shapes.

According to an aspect of the embodiment, the element is one of a dispersively or dissipatively bistable element.

According to an aspect of the embodiment, a computing structure comprises the optically bistable element, wherein the optically bistable element comprises at least one logic gate, and the computing structure is configured to perform a combinatorial logic function.

According to an aspect of the embodiment, the combinatorial logic function comprises one or more of an AND, OR, NAND, NOR, NOT or XOR logic function.

According to an aspect of the embodiment, the at least one logic gate comprises a flip-flop.

According to an aspect of the embodiment, a computing structure comprises the optically bistable element, wherein the optically bistable element comprises at least one logic gate, and the at least one logic gate is configured to perform a sequential logic function.

According to an aspect of the embodiment, the optically bistable element comprises a memory.

According to an aspect of the embodiment, the nano-particles comprise portions arranged in chains allowing propagation of the LPPs along the chains.

According to an aspect of the embodiment, the portions arranged in chains include inter-connected, cross-connected or un-connected chains.

According to an aspect of the embodiment, the portions arranged in chains include a portion with a progressively different size of nano-particles such that LPPs traveling along the portion are converted into photons, photoelectrons, or alternative polarization states.

According to an aspect of the embodiment, the optically bistable element is configured to have a Mach-Zender arrangement.

According to an aspect of the embodiment, the optically bistable element is configured to have a Fabry-Perot arrangement.

According to an aspect of the embodiment, the optically bistable element is configured to have an intrinsic feed back arrangement, wherein the nano-particles are arranged in a linear chain.

According to an aspect of the embodiment, the nano-particles are arranged to include a nonlinear optical element.

According to an aspect of the embodiment, the nonlinear optical element comprises a central nano-particle, having an elongated ellipsoid shape, and two adjacent nano-particles arranged on opposite sides from each other of the central nano-particle, the two adjacent nano-particles being spaced from the central nano-particle such that a strong field dependent nonlinear optical effect is instigated by a presence of an LPP at the nonlinear optical element.

According to an aspect of the embodiment, the plurality of nano-particles are formed by at least one of electron-beam lithography, focused ion-beam, nano-imprinting, colloidal-suspension patterning, biological assembly methods, DNA-scaffolding techniques, membrane projection, or colloid hole lithography.

According to one embodiment of the invention there is provided an optically multi-stable element. The optically multi-stable element comprises an arrangement of nano-particles configured to propagate localized plasmon-polaritons (LLPs).

BRIEF DESCRIPTION OF THE DRAWINGS

FIG. 3 is a graph illustrating the field strength as a function of nano-particle separation.

FIG. 4 is a schematic of an optically bistable switch of a Mach-Zender geometry according to an embodiment of the invention.

FIG. 5 is a schematic of an optically bistable switch of a Fabry-Perot geometry according to an embodiment of the invention.

FIG. 6 is a schematic of an optically bistable switch of an intrinsic feedback design according to an embodiment of the invention.

DETAILED DESCRIPTION OF THE PREFERRED EMBODIMENTS

An embodiment of an optically bistable switching element is described, where the element comprises an arrangement of nano-particles configured to propagate localized plasmon-polaritons (LPPs). LPP logic gates were described in U.S. patent application Ser. No. 13/360,575 entitled "LPP LOGIC GATES AND COMPUTING," filed on Jan. 13, 2012, the entire contents of which are incorporated by reference herein. The present application describes a switching element using nano-particles, where the switching element is bistable, or multi-stable. This application goes beyond the logic and computing concepts described in U.S. patent application Ser. No. 13/360,575 entitled "LPP LOGIC GATES AND COMPUTING," and describes the use of nano-non-linear-optics (NLO) in chains of nano-particles to create low power nonlinear bi-stable, or multi-stable, optical switches useful for nano-logic-elements, nano-electronic-memory elements and transistor action on the nano-scale. The optical processes for the NLO may be $\chi^{(3)}$ or $\chi^{(2)}$.

Optical Bistability

Two important features of optical bistability are nonlinearity and feedback. This application describes geometries for achieving both nonlinearity and feedback simultaneously in chains of nano-particles; useful for switching, memory elements and implementations of basic logic functions.

Figure 1:
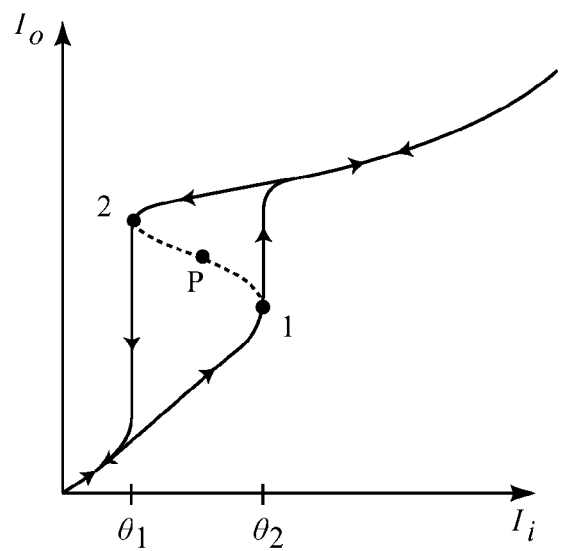
FIG. 1 is a graph illustrating optical bistability.

FIG. 1 illustrates in general the concept of optical bistability in terms of an input optical intensity, $I_i$ into a material, and an output optical intensity, $I_o$. As can be seen the output optical intensity, $I_o$ has two values for a given input intensity $I_i$ in the region between $\theta_1$ and $\theta_2$. Thus, the material is optically bistable.

Figure 2:
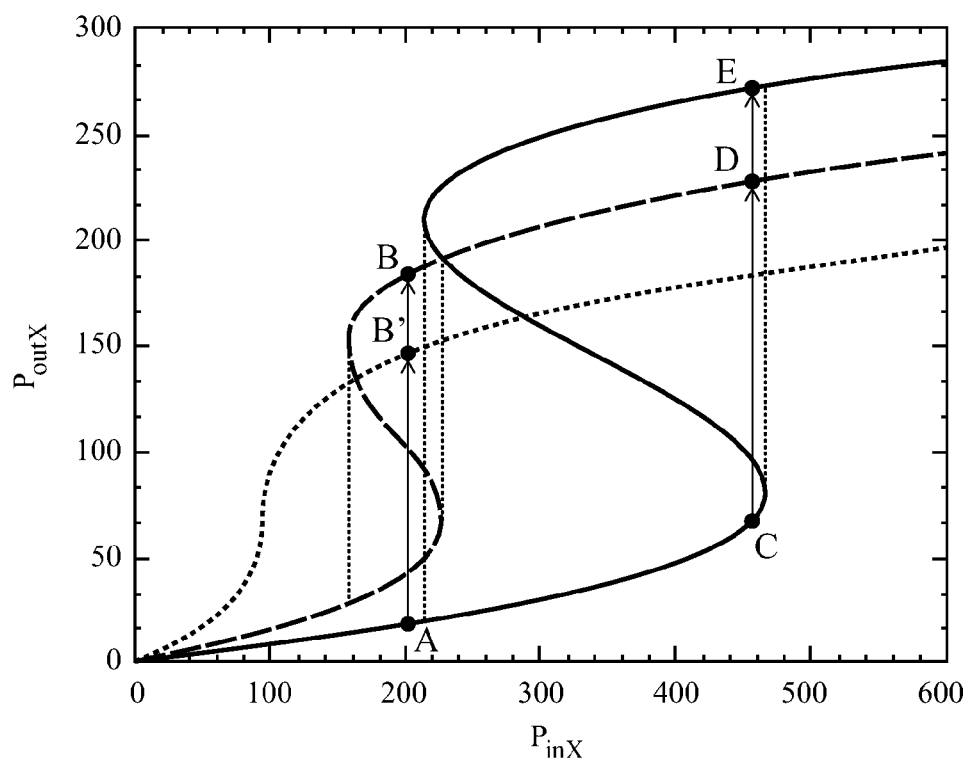
FIG. 2 is a graph of output power $P_{out}$ vs. input power $P_{in}$, which illustrates transistor action in a bistable device.

FIG. 2 is a qualitative graph of output power $P_{out}$ vs. input power $P_{in}$, which illustrates transistor action in a bistable device. The solid, dotted and dashed lines correspond to various control output powers, appropriate for various times in the switching process. To demonstrate the transistor action, follow the solid line. The power of the input $P_{in}$ is selected to be below the bistable region in the absence of the control input (point A on the solid curve in FIG. 2). After the steady state has been reached, a control pulse with a power of $P_{in}$ is launched. The control pulse switches the signal output $P_{out}$ to a higher level in approximately 10 fs (point B on the dashed bistability line in FIG. 2). Finally, the control pulse at t, and the signal output returns to a low transmission state, completing a reversible switching cycle.

The optical bistability will depend on the field enhancement between adjacent nano-particles. Other factors in the bistability are the general refractive index and complex dielectric constant due to the nano-particles, and the polarizability, absorption, scattering cross-sections and effects of particle-shape. General refractive index and complex dielectric constants of metals, semiconductors and dielectric materials are described in [Palik, E. D., (1998) 'Handbook of Optical Properties of Solids', Elsevier.]. The polarizability, absorption, scattering cross-sections and effects of particle-shape may be calculated as set out by [Maier, S. A., (2007) 'Plasmonics', Springer.].

Field-enhancement between adjacent nano-shapes is set out by [Bohn, J. L., et al., (2001) 'Field enhancement in apertureless near-field scanning optical microscopy', JOSA A, 18, pp. 2998-3006.], and such fields can then be used to estimate the nonlinear optical properties [Boyd, R. W., (2003) 'Nonlinear Optics', Academic Press, $2^{nd}$ Edition.] of closely-spaced nano-particles, as needed for computations of optical bistability [Saleh, B. E. A. & Teich, M. C., (2007) 'Fundamentals of Photonics', Wiley-Interscience, $2^{nd}$ Edition, pp 1058-1067.]. A full quantum mechanical approach to this problem has been described by [Marinica, D. C., et al., (2011) 'Quantum Plasmonics: nonlinear effects in the field enhancement of a plasmonic nanoparticle dimer' Nano Letters, doi: 10.1021/n1300269c, online in November 2011.], and is appropriate for calculations involving sub-one-nanometer dimensions. Above 1-nm scales, classical calculations are acceptable [Duan, H., et al., (2012) ' Nanoplasmonics: classical down to the nanometer scale', Nano Letters, doi: 10.1021/n13001309, online in February 2012.]. Field-enhancements of 1000× to 10,000×, and greater, are possible in the nanometer regime, and thus strong nonlinear optical effects are possible.

Of particular importance in designing nonlinear optical effects on nanometer and sub-nanometer dimensions is the inverse-cubed dependence of the effects (classical regime) on nano-particle separation and diameter in certain embodiments. A strong optical nonlinearity may be obtained for weak optical power densities in nano-particle chains, thus very low-power optical bistable effects are achievable according to one embodiment.

The inverse-cubed relationship of the field strength is shown in Equation 1 below. The non-linear refractive index is directly proportional to the field-strength between the nano-particles, which is K(d):

$$\kappa(d) := 1 + \frac{2 \cdot \alpha \left[ \frac{1}{Rc^3} + \frac{\beta}{(2 \cdot d + Rc)^3} \right]}{1 - \left[ \alpha \frac{\beta}{4 \cdot (d + Rc)^3} \right]}, \quad \text{(Equation 1)}$$

where K is the field strength, d is the distance between the nano-particles, α is the polarizability of the particles, Rc is the radius of the nano-particles, and $$\beta := \frac{(\varepsilon - 1)}{(\varepsilon + 1)},$$

where ε is the electric-permittivity of the nano-particle material.

An example of field enhancement factor expressed as the real part of the field strength as a function of 1-nm sized nano-particles' separation distance for two adjacent particles is shown in FIG. 3.

Optical Bistable Switch Geometries

Three different chain nano-particle geometries for an optical bistable switch based on dispersive nonlinearity are described by extending known standard optical bistable (OB) geometries [see Saleh and Teich, 2007; pp. 1062-1064] to the chain nano-particle domain. In dispersive OB, the refractive index, n, is a function of the optical intensity. Dispersive nonlinear elements are preferred over dissipative nonlinear elements, because dissipative nonlinear elements are based on the absorption-coefficient being a function of optical intensity, and thus have the potential for very significant heating at the nanometer spatial-scale. In a dispersive nonlinear element, the refractive index, n, is a function of the optical intensity, I, while in a dissipative optical element, the absorption coefficient, a, is a function of the optical intensity, I. All three chain nano-particle geometries are based on nonlinearity and feedback.

Mach-Zender Geometry

FIG. 4 illustrates a nano-particle geometry for an optical bistable switch 400 based on a Mach-Zender design. This geometry is based on a traditional Mach-Zender OB arrangement without nano-particles [Saleh and Teich, 2007; FIGS. 23. 4-9, p 1063].

The optical bistable switch 400 includes a plurality of first nano-particles 10, a plurality of second nano-particles 12, a third nano-particle 14, and a fourth nano-particle 16. The second nano-particles 12 have a horizontally elongated elliptical or ellipsoidal shape, as compared to the first nano-particles 10.

The switch 400 includes two branches, where a first branch 20 is shorter than the second branch 30. Both the first branch 20 and second branch 30 comprise a plurality of first nano-particles 10. The switch 400 further includes a third branch 40 comprising the horizontally elongated elliptical second nano-particles 12, a non-linear element 50 comprising one of the horizontally elongated elliptical second nano-particles 12 and two adjacent of the first nano-particles 10, and an energy dump structure 60 comprising the third nano-particle 14 and the fourth nano-particle 16.

In the FIG. 4 design, as well as the FIG. 5 design below, the elongated elliptical second nano-particles 12 control the branching energy ratio and directionality of the propagated LPP energy. The LPPs propagate preferentially to the next adjacent horizontally elongated elliptical nano-particle.

FIG. 4 illustrates the direction of propagation of LPPs in the switch 400 using arrows. An LPP propagating along the chain at the input $I_{in}$, position splits into the two branches 20 and 30, in the Mach-Zender interferometer manner, which recombine to interfere later at the non-linear element 50. Part of the output LPP from the second branch 30 is again split-off at the branch point B and routes back on itself to the top one of the horizontally elongated elliptical second nano-particles 12, where the LPP propagates down the chain of elliptical nano-particles in the third branch 40 to interfere with the incoming LPP at the non-linear element 50.

Excess energy from the third branch 40 of horizontally elongated elliptical second nano-particles 12 is dumped into the energy dump structure 60 by allowing the LPP to escape through the third nano-particle 14, which is a smaller ellipsoid, and then to a fourth nano-particle 16, which is a spherical nano-particle too small to contain the residual LPP energy.

The needed non-linear aspect of this design is in the non-linear element 50 comprising one of the horizontally elongated elliptical second nano-particles 12 and two adjacent of the first nano-particles 10. Between these three nano-particles, the spacings is provided to be so small that a strong field dependent nonlinear optical effect is instigated by the presence of an LPP. This non-linear field enhancement is described above with respect to FIG. 3.

The transmittance, $I_{out}$ shown in FIG. 4 is a monotonic function of the intensity-dependent refractive index $n=n(I_{out})$. By treating the elongated ellipsoid nanoparticle 12 of the nonlinear element 50 and its adjacent two smaller nano-particles 10 on either side as a circulating resonant cavity, the same math applies as for the Mach-Zender interferometer version of OB [Saleh and Teich, 2007; FIGS. 23. 4-9, p 1063].

Fabry-Perot Geometry

FIG. 5 illustrates a nano-particle geometry for an optical bistable switch 500 based on a Fabry-Perot design. This geometry is based on the traditional Fabry-Perot OB arrangement without nano-particles [Saleh and Teich, 2007; FIGS. 23. 4-10, p 1064].

The optical bistable switch 500 in FIG. 5 includes a plurality of first nano-particles 10, a plurality of second nano-particles 12, a third nano-particle 14, and a fourth nano-particle 16. The second nano-particles 12 have a horizontally elongated elliptical or ellipsoidal shape, as compared to the first nano-particles 10, in a similar fashion to the switch 400 in FIG. 4.

The switch 500 includes a first branch 20 comprising a plurality of the first nano-particles 10. The switch 500 further includes a third branch 40 comprising the horizontally elongated elliptical second nano-particles 12, a non-linear element 50 comprising one of the horizontally elongated elliptical second nano-particles 12 and two adjacent of the first nano-particles 10, and an energy dump structure 60 comprising the third nano-particle 14 and the fourth nano-particle 16.

In the FIG. 5 design, in a similar fashion to the FIG. 4 design, the elongated elliptical second nano-particles 12 control the branching energy ratio and directionality of the propagated LPP energy. The LPPs propagate preferentially to the next adjacent horizontally elongated elliptical nano-particle.

FIG. 5 illustrates the direction of propagation of LPPs in the switch 500 using arrows. The LPP propagates along the chain at the input $I_{in}$, position. Part of the output LPP from the first branch 20 is split-off and routes back on itself to the top one of the horizontally elongated elliptical second nano-particles 12, where the LPP propagates down the chain of elliptical nano-particles in the third branch 40 to interfere with the incoming LPP at the non-linear element 50.

Excess energy from the third branch 40 of horizontally elongated elliptical second nano-particles 12 is dumped into the energy dump structure 60 by allowing the LPP to escape thorough the third nano-particle 14, which is a smaller ellipsoid, and then to a fourth nano-particle 16, which is a spherical nano-particle too small to contain the residual LPP energy.

The needed non-linear aspect of this design is in the non-linear element 50 comprising one of the horizontally elongated elliptical second nano-particles 12 and two adjacent of the first nano-particles 10. Between these three nano-particles, the spacings is provided to be so small that a strong field dependent nonlinear optical effect is instigated by the presence of an LPP. This non-linear field enhancement is described above with respect to FIG. 3.

The transmittance, $I_{out}$ shown in FIG. 4 is a monotonic function of the intensity-dependent refractive index $n=n(I_{out})$. By treating the elongated ellipsoid nanoparticle 12 of the nonlinear element 50 and its adjacent two smaller nano-particles 10 on either side as a circulating resonant cavity, the same math applies as for the Fabry-Perot interferometer version of OB [Saleh and Teich, 2007; FIGS. 23. 4-10, p 1064].

Intrinsic Feedback Geometry

FIG. 6 illustrates a nano-particle geometry for an optical bistable switch 600 based on an intrinsic feedback design. This geometry is based on the traditional intrinsic feedback OB arrangement [Saleh and Teich, 2007; FIGS. 23. 4-11, p 1064].

The optical bistable switch 600 in FIG. 6 includes a plurality of first nano-particles 10, and a second nano-particle 12. The second nano-particle 12 has a horizontally elongated elliptical or ellipsoidal shape, as compared to the first nano-particles 10, in a similar fashion to the switch 400 in FIG. 4, and the switch 500 in FIG. 5.

The optical bistable switch 600 in FIG. 6 includes a non-linear element 50 comprising the horizontally elongated elliptical second nano-particle 12 and two adjacent of the first nano-particles 10.

The LPP propagates along the chain of first nano-particles at the input $I_{in}$ position. The needed non-linear aspect of this design is in the non-linear element 50 comprising the horizontally elongated elliptical second nano-particle 12 and two adjacent of the first nano-particles 10. Between these three nano-particles, the spacings is provided to be so small that a strong field dependent nonlinear optical effect is instigated by the presence of an LPP. This non-linear field enhancement is described above with respect to FIG. 3.

In the FIG. 6 optical switch 600 design, the optical feedback is internal, instead of external, as in the FIG. 4 and FIG. 5 interferometer designs. The internal LPP intensity controls the active 'three-nano-particle' medium's refractive-index, n, and thus the overall transmittance of the system.

The transmittance, $I_{out}$ is a function of the intensity-dependent refractive index, n. By treating the horizontally elongated elliptical second nano-particle 12 and its adjacent two smaller nano-particles (the first nano-particles 10 on either side) as an in-line resonant nano-cavity, the same math applies as for the intrinsic feedback version of OB [Saleh and Teich, 2007; FIGS. 23. 4-11, p 1064].

Optical Bistable Switch Materials

For the optical bistable elements described herein, the nano-particles are embedded within a matrix material. The nano-particles comprise at least one of a metal, a semiconductor, a doped oxide, a doped nitride, a carbon nanotube, or grapheme, for example. The metal may comprise gold or silver, for example, where the matrix material may be a semiconductor, such as silicon. The nano-particle sizes may be in the region between a characteristic dimension of 0.1 nm to 500 nm. The nano-particles may have shapes including spheres, spheroids, ellipsoids, cylinders, cubes, stars, rectangular-cubic, spiral-twisted, v-shapes, or left or right square C shapes, for example.

Basic LPP Logic Structure Concepts

Basic LPP logic components and their layouts for nano-particle structures without optical bistable switches are described in U.S. patent application Ser. No. 13/360,575 entitled "LPP LOGIC GATES AND COMPUTING," filed on Jan. 13, 2012, the entire contents of which are incorporated by reference herein.

The above described optical bistable switches may be used to provide Basic LPP logic components and their layouts. Basic LPP logic components and their layouts using optical bistable switches are shown schematically in FIGS. 7A-7D, which respectively illustrate a transistor, AND gate, NOT gate and OR gate. The transistor 700 may comprise a number of nano-particles 702 embedded in a matrix material of a substrate 708, along with an optically bistable switch 300, such as the optically bistable switch designs described with respect to FIGS. 4-6, above. For example, the transistor 700 may comprise two nano-particles 702 on either side of the switch 300 in a row in a vertical column, and another particle 702, horizontally adjacent the switch, to act as the gate with the switch 300, where the particles 702 are of an appropriate shape, such as spheriodal or spherical nano-particles, and size, such as 0.1 nm to 2000 nm, or preferably 10 nm to 50 nm in characteristic size. The spacing between adjacent nano-particles may be 0.1 nm to 2000 nm, or preferably 10 nm to 50 nm in characteristic size. The nano-particles 702 are arranged in the substrate such that the LPPs may propagate along particles 702; for example, where they can propagate with a velocity of ~0.2c, ie, $6 \times 10^7$ m/s or more according to one embodiment [Maier, S. A., (2006) 'Gain-assisted propagation of electromagnetic energy in sub-wavelength surface plasmon polariton gap waveguides', Opt. Comm 258, 295.].

Spheriodal or spherical nano-particles are preferred over nano-rods or nano-wires, because using nano-rods or nano-wires for the propagation of an LPP in a lengthwise connected chain will have a very high loss for their longitudinal/axial-mode propagation according to one embodiment. It is the transverse rod mode that propagates with low loss, but only in a chain of close-coupled nano-particles.

Figure 7A:
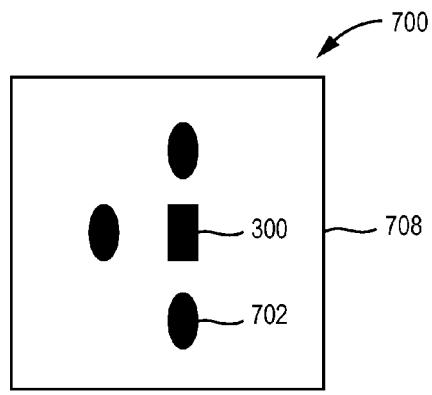
FIGS. 7A-7D are schematics of a transistor, AND gate, NOT gate and OR gate, respectively, according to an embodiment of the invention.

In the transistor structure shown in FIG. 7A, the two horizontally adjacent of the nano-particles 702 on the lefthand side and the switch 300 act as the 'gate' (or 'base' in other transistor terminology), for when the correct gate state is on the lefthand side nano-particle 702, it can cause the chain propagation along the vertical-column (the two nano-particles 702 on either side of the switch 300 in a row in a vertical column and the switch) to be stopped. Without that gate state on the lefthand side nano-particle, chain propagation of the LPP can continue along the vertical column of three nano-particles. The gate state will depend on the LLP state that has been applied to the gate by an LPP excitation source. That is, for a sufficient optical intensity to turn the switch 300 ON according to the bistable aspects of the switch 300.

Figure 7B:
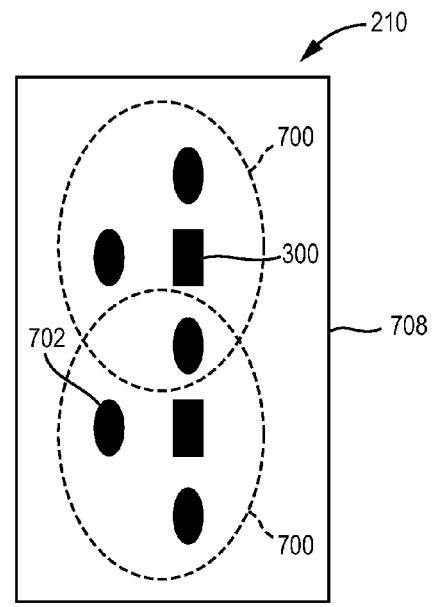

FIG. 7B illustrates a structure 710 for an AND logic function. The AND logic function comprises two LPP transistors, such as described in FIG. 7A, in series, now with the required two gates shown as the lefthand side nano-particles 702 and associated switches 300.

Figure 7C:
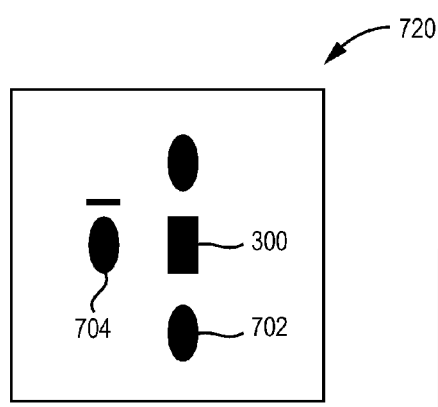

FIG. 7C illustrates a structure 720 for a NOT logic function. The NOT function is a transistor with an 'inverse' gate state applied to the transistor gate nano-particle (the nano-particle 702 on the left), denoted by a bar over the lefthand side gate nano-particle.

Figure 7D:
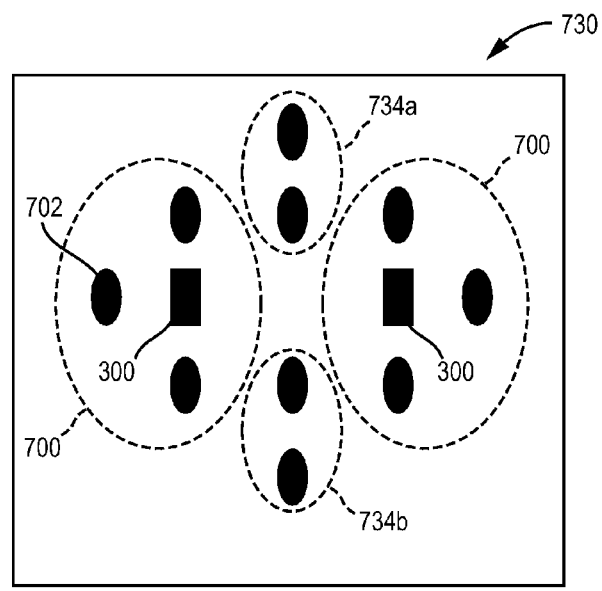

FIG. 7D illustrates a structure 730 for an OR logic function. This structure has two transistors connected in parallel, on the left and right hand side in FIG. 7D, respectively. This structure further has the two transistors connected with lateral (transverse mode) coupling to center nano particles arranged as a top chain 734a and a bottom chain 734b of nano-particles. The logical OR function can be created to act on the propagating LPP that enters top chain 734a or bottom chain 734b.

Universal Logic Gates and Combinatorial Logic

The above basic AND, OR and NOT structures may be used to create the standard Universal logic structures, such as NAND and NOR structures. An XOR structure may be formed using four cross connected NAND gates as described later.

Figure 8A:
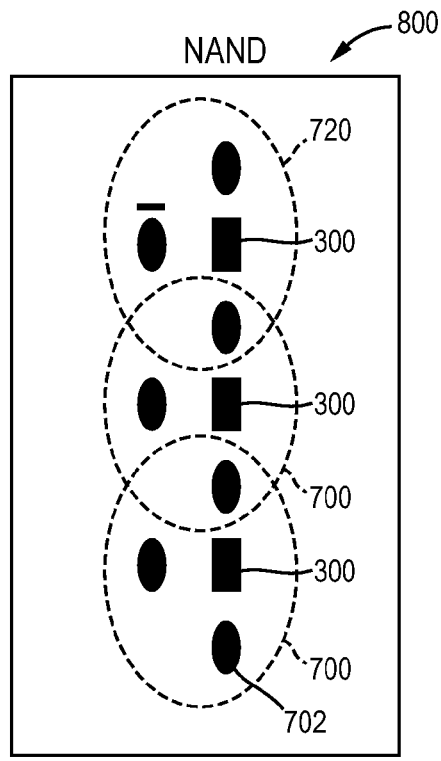
FIGS. 8A and 8B are schematics of a NAND structure and NOR structure, respectively, according to an embodiment of the invention.
Figure 8B:
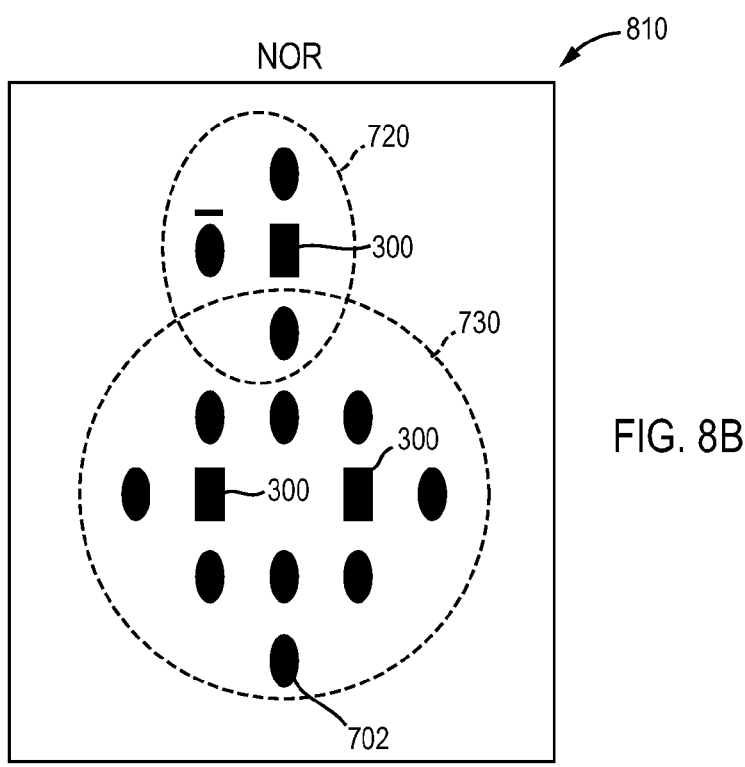

FIGS. 8A and 8B illustrate a NAND and NOR structure, respectively, formed based on the structures from FIGS. 7A-7D.

A simple NAND structure 800 in FIG. 8A is made by using serially the two transistor AND function of transistors 700, followed by the NOT function 720. The LPPs move from the bottom of the page towards the top.

A simple NOR structure 810 in FIG. 8B is made by using in parallel the two transistor OR function 730 followed by the NOT function 720. LPPs move from the bottom of the page towards the top.

It is well known that NAND logic allows all computing logic elements to be constructed. This fact can be taken advantage of by conceptually mapping the nano-particle NAND structure 800 shown in FIG. 8A onto the vast array of known and used NAND-based computing architectures.

Sequential Logic Structures Such as Flip Flops

Sequential logic structures allow for the creation of computers from the combinatorial logic structures just described. A most basic sequential logic structure is the flip flop, and many different variants of the flip flop are known and used. A simple version of the flip flop is described below with respect to FIG. 9.

The basic flip flop comprises two cross-coupled NAND logic-structures. Many other types of flip flops are possible, also using cross-coupled NAND gates: J-K, D-type, SR-type etc. For J-Ks, counters, registers, memory, shift-registers, arithmetic, CPUs, etc., and complete computer construction, universal NAND structures must be inter-connected per the standard logic circuits used today, such as described in Mano

[Mano, M. M. (1979), 'Digital Logic and Computer Design', Prentice Hall Inc.], but now using LPP components.

Figure 9:
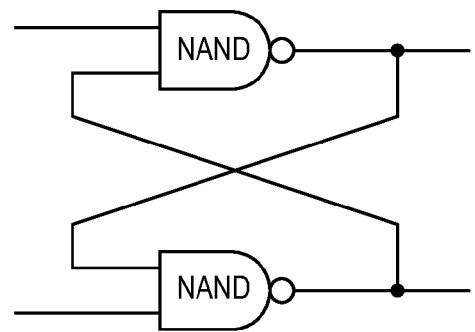
FIG. 9 is a schematic of a flip flop structure.
Figure 10:
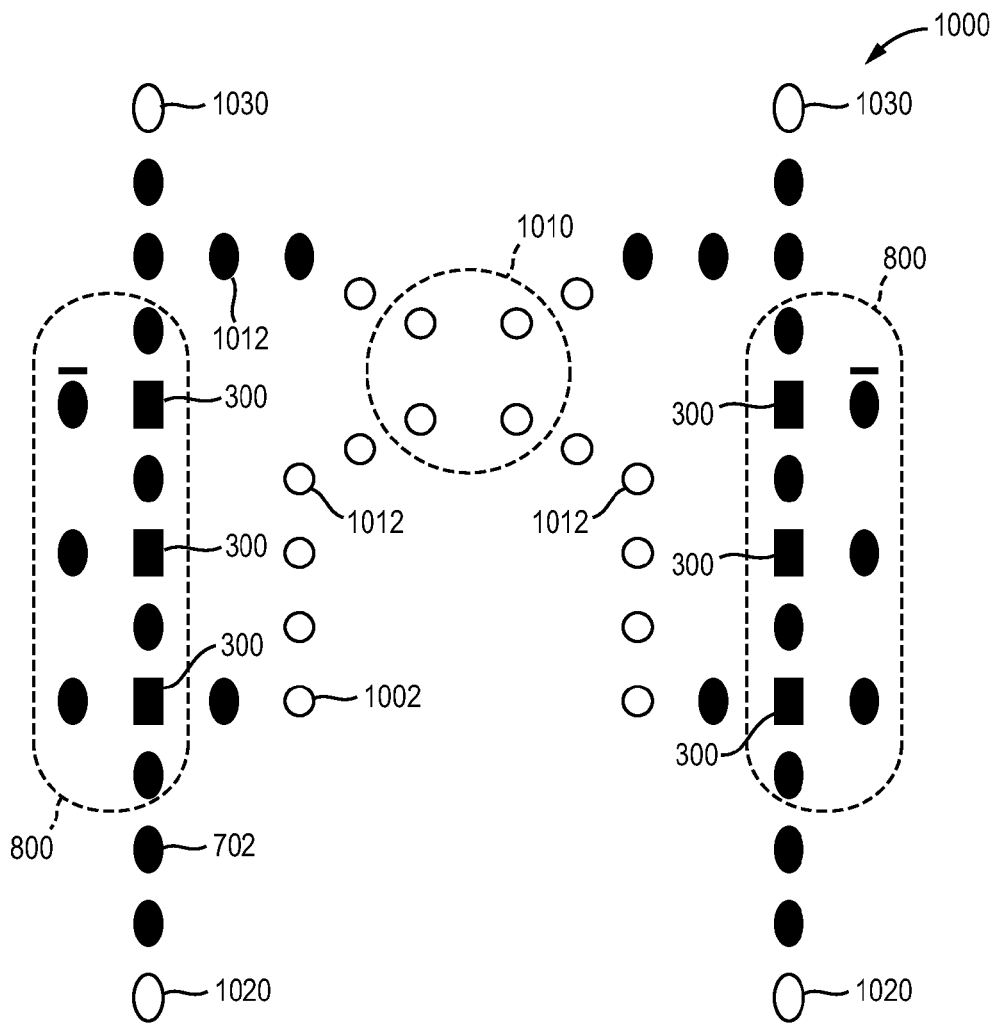
FIG. 10 is a schematic of a flip flop structure based on LPP propagation, according to an embodiment of the invention.

FIG. 10 recreates the basic flip-flop shown in FIG. 9 based on the NAND gates 800 illustrated in FIG. 8A, where the NAND gates are cross-coupled.

The basic flip-flop 1000 further includes a cross-coupling section 1010 which allows for the cross-coupling the chain propagating LPPs without interference between the propagating LLPs. If two chains are brought together, where the nano-particles are made of spheres or spheroids, the adjacent nano-particles at the intersection vertex will be close enough for the two propagating LPPs to co-interfere and destroy or corrupt their information. It is noted that orthogonal nano-wires or nano-rods can couple to adjacent wires/rods without interference, as the longitudinal and transverse LPP modes are orthogonal.

To avoid interference in the cross-coupling section 1010 shown in FIG. 10 the shape of the nano-particles 702 are important. In this case, we choose to convert the chain propagating LPP mode from spheroidal nano-particles to spherical to turn the corners of the flip-flop nano-particle arrangement, and then convert nano-spheroidal/spherical to nano-wires/rods nano-particles at the cross-coupling section 1010. The nanoparticles 1002 are arranged at cross-coupling section 1010 aligned in a square/diamond-shape for their now transverse mode LLPs to cross-couple, without interference.

The flip flop 1000 in FIG. 10 further includes LLP excitation light sources 1020 arranged to provide excitation light into the logic components of the flip flop 1000, and logic state detectors 1030 arranged to receive light and detect the logic state of the flip flop.

Fabrication

The nano structures here may be formed by a number of techniques. For example, the nano-particles may formed by at least one of 2-dimensional or 3-dimensional fabrication employing electron-beam lithography, focused ion-beam, nano-imprinting, colloidal imprinting, DNA-scaffolding techniques, membrane projection, or colloid hole lithography. The nano structures here may be formed using bio-macromoleclue such as proteins and peptides. The nano structures here may be formed using colloidal-suspensions of nano-particles of suitable size and shape—manipulated into a desired pattern.

The embodiments of the invention has been described in detail with particular reference to preferred embodiments thereof, but it will be understood by those skilled in the art that variations and modifications can be effected within the spirit and scope of the invention.

What is claimed is:

1. An optically bistable element, comprising:
an arrangement of nano-particles configured to propagate localized plasmon-polaritons (LPPs),
wherein the optically bistable element comprises at least one logic gate, and the computing structure is configured to perform a combinatorial logic function.

2. The computing structure of claim 1, wherein the combinatorial logic function comprises one or more of an AND, OR, NAND, NOR, NOT or XOR logic function.

3. The computing structure of claim 1, wherein the at least one logic gate comprises a flip-flop.

4. An optically bistable element, comprising:
an arrangement of nano-particles configured to propagate localized plasmon-polaritons (LPPs),
wherein the optically bistable element comprises at least one logic gate, and the at least one logic gate is configured to perform a sequential logic function.

5. An optically bistable element, comprising:
an arrangement of nano-particles configured to propagate localized plasmon-polaritons (LPPs),
wherein the nano-particles comprise portions arranged in chains allowing propagation of the LPPs along the chains.

6. The optically bistable element of claim 5, wherein the nano-particles are embedded within a matrix material, the nano-particles comprise at least one of a metal, a semiconductor, a doped oxide, a doped nitride, a carbon nanotube, or graphene.

7. The optically bistable element of claim 6, wherein the metal comprises gold or silver.

8. The optically bistable element of claim 5, wherein the nano-particle sizes are in the region between a characteristic dimension of 0.1 nm to 500 nm.

9. The optically bistable element of claim 5, wherein the nano-particles comprise nano-particles with shapes including spheres, spheroids, ellipsoids, cylinders, cubes, stars, rectangular-cubic, spiral-twisted, v-shapes, or left or right square C shapes.

10. The optically bistable element of claim 5, wherein the element is one of dispersively or dissipatively bistable.

11. A computing structure comprising the optically bistable element of claim 5, wherein the optically bistable element comprises a memory.

12. The optically bistable element of claim 5, where the portions arranged in chains include inter-connected, cross-connected or un-connected chains.

13. The optically bistable element of claim 5, wherein the portions arranged in chains include a portion with a progressively different size of nano-particles such that LPPs traveling along the portion are converted into photons, photoelectrons, or alternative polarization states.

14. The optically bistable element of claim 5, configured to have a Mach-Zender arrangement.

15. The optically bistable element of claim 5, configured to have a Fabry-Perot arrangement.

16. The optically bistable element of claim 5, configured to have an intrinsic feed back arrangement, wherein the nano-particles are arranged in a linear chain.

17. The optically bistable element of claim 5, wherein the nano-particles are arranged to include a nonlinear optical element.

18. The optically bistable element of claim 5, wherein the plurality of nano-particles are formed by at least one of electron-beam lithography, focused ion-beam, nano-imprinting, colloidal-suspension patterning, biological assembly methods, DNA-scaffolding techniques, membrane projection, or colloid hole lithography.

19. The optically bistable element of claim 17, wherein nonlinear optical element comprises a central nano-particle, having an elongated ellipsoid shape, and two adjacent nano-particles arranged on opposite sides from each other of the central nano-particle, the two adjacent nano-particles being spaced from the central nano-particle such that a strong field dependent nonlinear optical effect is instigated by a presence of an LPP at the nonlinear optical element.

* * * * *